United States Patent [19]

Bowman

[11] Patent Number: 4,772,578

[45] Date of Patent: Sep. 20, 1988

[54] METHOD OF PREPARING SUPPORTED CATALYSTS

[75] Inventor: Robert G. Bowman, Midland, Mich.

[73] Assignee: The Dow Chemical Company, Midland, Mich.

[21] Appl. No.: 53,923

[22] Filed: May 26, 1987

Related U.S. Application Data

[63] Continuation-in-part of Ser. No. 826,154, Feb. 4, 1986, Pat. No. 4,689,316.

[51] Int. Cl.⁴ .................. B01J 21/08; B01J 23/50; B01J 27/20; B01J 29/06
[52] U.S. Cl. ..................................... 502/244; 502/60; 502/243; 502/250; 502/345

[58] Field of Search ................ 502/243, 60, 347, 250, 502/253, 78, 79, 424, 340, 342, 244

[56] References Cited

U.S. PATENT DOCUMENTS 4,689,316 8/1987 Bowman ............................. 502/243

Primary Examiner—Carl F. Dees
Attorney, Agent, or Firm—Marie F. Zuckerman

[57] ABSTRACT

Metal vapor may be deposited on catalyst supports to produce a first supported metal. The first supported metal may be converted into a supported metal catalyst by contacting the first supported metal with a solution of ions of a catalytic metal, which will electrodeposit on the support. This process is an alternative to the impregnation method preparing catalysts.

20 Claims, No Drawings

METHOD OF PREPARING SUPPORTED CATALYSTS

CROSS-REFERENCE TO RELATED APPLICATION

This application is a continuation-in-part of application Ser. No. 826,154, filed Feb. 4, 1986 (U.S. Pat. No. 4,689,316).

BACKGROUND OF THE INVENTION

This invention relates to preparation of supported catalysts and the supported catalysts prepared.

Supported catalysts are used to increase reaction rates over uncatalyzed reactions and/or obtain reaction products different from those produced in uncatalyzed reactions.

Solid catalysts react on their surface. Increased catalytic effect for a given amount of a catalyst can be accomplished by increasing the surface area of the catalytic material. One method to increase the surface area is to change the shape of the catalytic material. A more effective method of increasing the surface area of a catalyst is decreasing the size of the catalyst particles (and thereby increasing the number of catalyst particles). This method utilizes scaling factors. The surface area of a particle is proportional to the square of the particle's linear dimension (such as diameter). The amount or weight of the particle is proportional to the cube of the linear dimension. Therefore, the surface area of a given fixed amount of a catalytic material is proportional to the reciprocal of the linear dimension provided the shape of the particles remain constant.

Generally, smaller catalyst particles have a larger specific surface area thereby allowing the use of a smaller mass of catalyst for the same catalytic effect. However, small catalytic particles are expensive to remove from most systems. Therefore, the use of a catalyst support, which is large relative to the catalytic particles to which small catalytic particles are affixed, allows use of small particles of a catalytic material without creating the problem of removal of small catalytic particles.

The catalytic particles must be affixed to the surface of the catalyst support in order to have a catalytic effect. Many methods of affixing the catalytic particles to the surface of the catalyst support's surface are known. For example, U.S. Pat. No. 3,856,709 discusses the process of mashing soft particles onto a relatively hard substrate.

To increase the surface area of the catalyst support, without reducing the size of the support, a porous support is used. In order to use this increased surface area, the catalytic particles must be deposited on the inside of the pores of the catalyst support.

U.S. Pat. No. 2,107,611 discusses a process of spraying an acetone suspension of small catalytic particles onto support particles, then drying the acetone to leave catalytic particles on the support.

U.S. Pat. No. 2,818,350 discusses a process of vaporizing a vaporizable fluid of a suspension of solid alkali metal particles in a vaporizable fluid to attach the catalytic particles to the catalyst support.

U.S. Pat. No. 3,216,947 discusses a process of depositing a sodium metal on a catalyst support by high speed stirring (10,000 rpm) of sodium, a high boiling hydrocarbon and potassium at an elevated temperature.

U.S. Pat. No. 3,264,226 discusses a process of plasma arc spraying of catalytic material upon a catalyst support.

U.S. Pat. No. 4,255,285 discusses a process of atomizing a water solution of catalyst ions, applying the atomized solution to moving catalyst supports, and then drying and heat treating the wetted supports.

All of the aforementioned processes lack the ability to deposit catalytic particles deep into the pores of a catalyst support.

U.S. Pat. No. 4,305,844 discusses a "suspension method" for forming supported catalysts which involves mixing a suspension of silver oxide with the support. After the suspension is thus deposited on the support, the catalyst is activated. As pointed out in U.S. Pat. No. 4,305,844, this method produces a supported catalyst which readily loses catalytic particles. The process also has trouble depositing catalytic particles deep in the pores of the support.

Another method of depositing metals on supports is known as the "impregnation method". Generally, the support is impregnated or coated with a solution of the salt of the metal or metals to be employed. This is followed by drying and a subsequent reduction.

Although the reducing step can be a thermal reduction in the presence of air or an inert gas (U.S. Pat. No. 2,709,123), hydrogen and hydrazine (U.S. Pat. No. 3,575,888) have also been employed for the reduction. Reducing agents in the form of organic compounds have been added to the catalyst, either by simultaneous application to the support or subsequent addition to the impregnated metal salts. Also, reducing compounds have been known to be employed by incorporating them into the support prior to the addition of the catalytic component. While the solvent used to apply the reducing agent is frequently water, as in U.S. Pat. No. 3,702,259, organic solvents also have been employed, as for example, ethylene carbonate, dimethyl formamide and dimethyl sulfoxide, as solvents for the polyacrylonitrile in U.S. Pat. No. 3,892,679.

In U.S. Pat. No. 3,892,679, the use of non-aqueous solvents to precipitate a polymer from solution onto the support is indicated and is illustrated by the use of methanol and toluene. This method disadvantageously requires the preparation of a salt solution, impregnation of a support (if porous support is used) with the solution, drying of the impregnated support and reduction of the deposited salt. At times special care is needed to remove an undesirable counterion such as chloride. Some ions such as zinc are difficult to reduce and usually are present in the supported catalyst as zinc oxide or zinc (II). For example, the reduction potential of $Zn^{+2}$ to $Zn°$ is $-0.76$ v and that of $ZnO_2$ to $Zn°$ is $-1.22$ v.

It would be desirable to have a process which avoids the multiple steps of the "impregnation method" and the loose binding of the "suspension method", and yet has the ability to deposit metals deep into pores of porous catalyst supports. It would be even more desirable if such a process has the ability to deposit metals which are hard to reduce onto catalyst supports. Additionally, it would be desirable if the deposited metal can be converted by a simple procedure to a deposited catalytic metal.

SUMMARY OF THE INVENTION

In one aspect, the invention is the process of forming a supported metal catalyst. The process comprises:

(a) generating metallic vapor by heating zero valent metal to a temperature sufficient to generate at least about 0.25 atmospheres of metallic vapor;

(b) contacting the metallic vapor with a support under conditions sufficient to deposit the metallic vapor onto the support thereby forming a first supported metal, providing the heated zero valent metal is not in contact with the support; and (c) contacting the first supported metal with a solution containing ions of a catalytic metal which will electrodeposit on the support, thereby liberating ions of the first supported metal and forming a supported metal catalyst.

The process of this invention is capable of depositing metals deep into the pores of a catalyst support, including metals which are hard to reduce. Moreover, in accordance with the invention, the deposited metal may be easily converted to a supported catalytic metal by a simple electrochemical step.

In a second aspect, the invention is the catalyst formed by the preceding process. Supported catalysts produced by the process of this invention are useful in a wide variety of processes such as converting alkylenes into their oxides, cracking hydrocarbons, hydrogenating alkenes, and aminating alcohols.

DETAILED DESCRIPTION OF ILLUSTRATIVE EXAMPLES

For the purposes of this invention, deposition of the metallic vapor onto the support can occur in two ways: condensation of the metallic vapor onto the porous catalyst support or reaction of the metallic vapor with the catalyst support.

Preferably, the first supported metal (or deposited metallic vapor) is a zero valent metal with an oxidation potential of at least 0.3 volt relative to the Standard Hydrogen Electrode. Preferably, the zero valent metal produces a metallic vapor having a condensation temperature below about 2000 K., or a mixture of such metals. The metals comprising the mixture of metals may be separately heated to a temperature sufficient to generate appreciable metallic vapor. Preferably, only one zero valent metal is used. More preferable metals include sodium, potassium, rubidium, cesium, lithium, magnesium, calcium, strontium, barium, zinc, and cadmium. Even more preferable are zinc, cadmium, sodium, potassium, and magnesium. Most preferable is zinc.

For the purposes of this invention, condensation temperature of the metallic vapor means the gaseous-liquid equilibrium temperature of the metallic vapor at one atmosphere of pressure.

Any support which can be suitably employed in making supported catalysts by conventional methods may be used. Porous supports are preferred. More preferred are $SiO_2$, SiC, $TiO_2$, $BaTiO_3$, $Al_2O_3$, MgO, carbon black and zeolites. Most preferred is $SiO_2$. Chapters 4–7 and 9 of *Physical and Chemical Aspects of Adsorbents and Catalysts* by B. G. Linsen, Academic Press, NY, N.Y. (1970), contain a detailed discussion of supports and their preparation and are now incorporated by reference.

Preferably, the support particles have diameters between about 0.15 mm and about 15 mm. More preferably, the support particles have diameters greater than about 0.4 mm. More preferably, the support particles have diameters smaller than about 10 mm. Preferably, the support particles have porosities between about 0.01 cc/g of support and about 3.5 cc/g of support. More preferably, the support particles have porosities greater than about 0.1 cc/g of support. More preferably, the support particles have porosities less than about 1.0 cc/g of support. Preferably, the support particles have average BET surface areas between about 0.01 $m^2$/g of support and about 700 $m^2$/g of support. More preferably, the average surface area is greater than about 0.1 $m^2$/g of support. More preferably, the average surface area is less than about 600 $m^2$/g of support.

The vapor and catalyst support may be contacted in any manner that produces a supported metal, providing the heated zero valent metal and the support are not in contact. Preferred are two methods of contacting the metallic vapor and the support: diffusion contact and carrier-assisted contact.

The diffusion method comprises several steps. First, the zero valent metal and the support are placed into a container, in such a manner that they will not physically contact each other. Second, the container is sealed. Third, the container is heated to a temperature sufficient to generate appreciable metallic vapor. The metallic vapor will diffuse throughout the sealed container and contact the support. The container may be flushed with an essentially unreactive gas such as helium prior to sealing the container. The container may be operated at pressures above about 0.25 atmospheres. The pressure of the container is largely determined by the temperature of the container. Preferably, the pressure is between about 5 atmospheres and about 0.5 atmosphere. More preferably, the pressure is less than about 2 atmospheres. Preferably, the temperature of the container is less than about 100 K above the condensation temperature of the metallic vapor, more preferably less than about 50 K above the condensation temperature of the metallic vapor and most preferably less than about 20 K. above the condensation temperature of the metallic vapor. Typically, the condensation temperature of the metallic vapor is between about 300K. and about 2000K. Preferably, the container is a stainless steel tube with stainless steel caps. In using such a preferred container, a suitable separatory material such as quartz wool can be used to keep the support from contacting the zero valent metal. The separatory material should be present in an amount sufficient to prevent contact between the zero valent metal and the support, but insufficient to prevent sufficient contact between the metallic vapor and support to form a supported metal.

For the purposes of this invention, the term "essentially unreactive," noted hereinabove and hereinbelow, means does not react to an appreciable degree. Preferably less than about 10 mole percent of the amount present reacts, more preferably less than about 5 mole percent of the amount present reacts, and most preferably less than about 1 mole percent of the amount present reacts.

The container can be any container which can contain the zero valent metal while being at a temperature above the condensation temperature of the metallic vapor. Preferred is a stainless steel container.

The carrier assisted method of contact is similar to the diffusion method except the container is equipped with means to introduce an essentially unreactive carrier gas to assist the contact between the metallic vapor and the support. The carrier gas contacts the heated metal prior to contacting the support. Preferably, the carrier gas is preheated to the temperature of the container. Preferably, the reactor is a vertical cylinder loaded from the bottom toward the top with separatory material, zero valent metal, separatory material, catalyst support and separatory material. The separatory material is any material which will allow metallic vapor and carrier gas to pass but not allow zero valent metal or catalyst support to pass. Preferred separatory materials are quartz wool and quartz beads. Most preferred is quartz wool. The container is preferably heated to less than about 100 K. above the condensation temperature of the metallic vapor, more preferably less than about 50 K. above the condensation temperature and most preferably less than about 20 K. above the condensation temperature. The pressure is established by the carrier gas and the metallic vapor. Suitable pressures are above about 0.25 atmospheres. Preferable pressures are between about 5 atmospheres and about 0.75 atmosphere. Most preferable pressures are about 1 atmosphere. Typically, the metallic vapor comprises between a mole fraction of about 0.001 and about 1.0 of the carrier gas-metallic vapor stream. Preferably, the metallic vapor comprises between a mole fraction of about 0.25 and about 1.0 of the carrier gas-metallic vapor stream. The carrier-assisted method of contact is most preferred.

The contact is for a time sufficient to allow formation of a supported metal. Preferably, the contact time is less than about 10 hours, more preferably less than about 5 hours and most preferably less than about 2 hours.

Typically, the support particles are at a temperature between about 373 K. and about 1773 K. during the contact. Preferably, the support particles are at a temperature above about 473 K. Preferably, the support particles are at a temperature below about 1473 K. Typically, the space velocity of the carrier gas is between about 0.03 $hr^{-1}$ and about 3,000 $hr^{-1}$. Preferably, the space velocity is greater than about 0.3 $hr^{-1}$. Preferably, the space velocity is less than about 300 $hr^{-1}$.

The supported vapor, hereinafter referred to as the first supported metal, may be treated in any desirable manner such as reduction with hydrogen, addition of promoters, conversion of the supported metal into a supported catalyst, and the like.

In accordance with the practice of this invention, the preferred method of conversion of the first supported metal to a supported metal catalyst involves an electrochemical deposition. The electrochemical deposition comprises contacting the first supported metal with a solution containing one or more ions of a catalytic metal which will electrodeposit on the support, thereby liberating ions of the first supported metal and forming a supported metal catalyst. In this process it is recognized that the first supported metal gives up electrons and is oxidized. The oxidized first metal is liberated from the support as ions to the solution. Simultaneously, the ions of the catalytic metal in solution take up the electrons and are reduced. The reduced catalytic metal deposits or plates out onto the support.

The electrochemical process, described hereinabove, is meant to occur spontaneously. In order for such a spontaneous reaction to occur, the oxidation potential of the first supported metal must be greater than the oxidation potential of the catalytic metal. The oxidation potentials for a variety of metals can be found in any standard text on redox systems; see for example the *CRC Handbook of Chemistry and Physics* of any year. (It is noted that standard electrode potentials are tabulated as reduction potentials. One need only to reverse the sign of the reduction potential to obtain the oxidation potential.) For illustrative purposes the oxidation potential of several metals is given in Table I, however this list is not meant to be exhaustive or limiting of the scope of the invention.

TABLE I

| Metal | $E_{ox}$ (volts) |
| --- | --- |
| $K \rightarrow K^{1+}$ | +2.92 |
| $Na \rightarrow Na^{1+}$ | +2.71 |
| $Mg \rightarrow Mg^{2+}$ | +2.38 |
| $Zn \rightarrow Zn^{2+}$ | +0.76 |
| $Fe \rightarrow Fe^{2+}$ | +0.41 |
| $Cd \rightarrow Cd^{2+}$ | +0.40 |
| $Ni \rightarrow Ni^{2+}$ | +0.28 |
| $Sn \rightarrow Sn^{2+}$ | +0.14 |
| $Pb \rightarrow Pb^{2+}$ | +0.13 |
| $Cu \rightarrow Cu^{2+}$ | −0.34 |
| $Ag \rightarrow Ag^{1+}$ | −0.80 |
| $Pd \rightarrow Pd^{2+}$ | −0.83 |
| $Pt \rightarrow Pt^{2+}$ | −1.2 |

CRC Handbook of Chemistry and Physics, 57th edition, 1976, p. D-141.

Any zero valent metal in Table I can be used to reduce and deposit ions of a metal below it in the Table, that is, ions of a metal with a lower oxidation potential. For example, supported zero valent zinc can be used to reduce and deposit silver from a solution of silver ions, or nickel from a solution of nickel ions. Likewise, supported zero valent potassium can be used to reduce and deposit copper from a solution of copper ions. Similarly, supported zero valent magnesium can be used to reduce and deposit tin or palladium from a solution of these ions. In accordance with the practice of this invention, any catalytic metal is suitable, providing the oxidation potential of said catalytic metal is lower than the oxidation potential of the first supported metal.

The solvent of the solution may be any essentially unreactive liquid which will form a solution with the desired catalytic metallic ion. Aqueous and non-aqueous solvents meeting this requirement are suitable solvents. Preferably, only one catalytic metallic ion which will electrodeposit is present in the solution. More preferable examples of the electrodeposited catalytic metal are silver, copper, cobalt, nickel, iron, palladium, and platinum. Even more preferable examples of the electrodeposited catalytic metal are silver, copper, nickel, cobalt, and iron. Most preferably, the electrodeposited metal is silver. In accordance with the invention the more preferred method is that when the first supported metal is zinc, cadmium, sodium, potassium, or magnesium; the support is silica, alumina, silicon carbide, titania, magnesia, carbon, or silica-alumina zeolites; and the electrodeposited catalytic metal is silver, copper, nickel, cobalt, or iron. The most preferred method is that when the supported metal is zinc, the support is silica, and the electrodeposited catalytic metal is silver.

The loading of the first supported metal (deposited metallic vapor) can vary widely, as can the loading of the electrodeposited metal. Useful loading ranges for particular metals and catalyst supports may be determined by experimentation. Loadings expressed as weight percent in this patent are weight percent of the supported metal based on the weight of the support and the supported metal combined. However, generally loadings between about 0.05 weight percent and about 40 weight percent are preferred. Loadings between about 0.1 weight percent and about 29 weight percent are more preferred. Loadings between about 0.1 weight percent and about 10 weight percent are most preferred.

The first supported metals prepared by this process are preferably those which cannot be prepared by other techniques, such as those using a metal with an oxidation potential of at least 0.3 v. Preferred metals are Na, K, Rb, Cs, Li, Mg, Ca, Sr, Ba, Zn, and Cd; with Zn, Cd, Na, K, and Mg being even more preferred metals; and Zn being the most preferred metal. The supported metal catalysts produced by this process may be used in manners similar to the use of conventional supported catalysts.

The invention is further illustrated by the following nonlimiting examples. In the following examples, all the supports are particles with diameters between about 0.4 mm and about 0.9 mm.

EXAMPLE 1

A 0.5-inch round, stainless steel inert reactor is loaded from bottom to top as follows: ⅜ inch of quartz wool, 20.0 g of dried silica, ⅜ inch of quartz wool, 6.5 g of zinc particles (Zn°) and ⅜ inch of quartz wool. The reactor is heated to 920° C. in a muffle furnace. The reactor is kept at 920° C. for 90 minutes using a downward nitrogen carrier gas flow wherein the nitrogen is preheated to 925° C. The reactor is then cooled to room temperature. The cooled silica containing supported zinc metal (supported vapor) is removed from the reactor and is placed in about 0.100 liter of a 1.0M silver nitrate solution instantly turning from gray to black.

EXAMPLES 2-7

Example 1 is repeated with the reactor between 950° C. and 1000° C. and without a carrier gas. The supported silver catalyst is placed in boiling concentrated nitric acid and the resulting silver ions are detected through absorption spectroscopy. The results are reported in Tables I and II.

TABLE I

| Example | Support | Support Color | Supported Zn Color |
|---|---|---|---|
| 2 | SiO$_2$ (16 m$^2$/g) | white | white |
| 3 | SiO$_2$ (600 m$^2$/g) | white | light gray |
| 4 | SiC | dark black | dark gray |
| 5 | TiO$_2$ | white | black |
| 6 | BaTiO$_3$ | white | gray |
| 7 | Al$_2$O$_3$ | white | gray |

TABLE II

| Example | Supported Ag Color | Weight % Ag in Supported Ag Catalyst Based on Total Catalyst Weight |
|---|---|---|
| 2 | dark brown | 1.01 |
| 3 | dark brown | 0.43 |
| 4 | black/silver specks | 0.25 |
| 5 | black | 0.35 |
| 6 | dark gray | 1.01 |
| 7 | white/silver specks | 0.69 |

From the weight percent silver, the weight percent zinc which reacted with the silver ions can be calculated. This is a minimum amount of zinc which was deposited on the support. The results of the calculation are shown in Table III.

TABLE III

| Example | Weight % Zn in Supported Zn Catalyst Based on Total Catalyst Weight |
|---|---|
| 2 | 1.42 |
| 3 | 0.52 |
| 4 | 0.30 |
| 5 | 0.42 |
| 6 | 1.22 |
| 7 | 0.84 |

EXAMPLE 8

Example 3 is repeated using cadmium in place of zinc. The support is white, the supported cadmium vapor is gray and the supported catalyst is dark brown, with a loading of 0.75 weight percent silver.

EXAMPLE 9

Example 3 is repeated using a nitrogen carrier gas. The support is white, the supported zinc is gray and the supported silver is black with a loading of 1.85 weight percent silver.

EXAMPLE 10

Example 9 is repeated with a carbon catalyst support. The support and supported zinc and silver are all black. The supported silver has a loading of 1.82 weight percent silver.

EXAMPLE 11

Metallic zinc (0.5126 g) (powder) is placed in a ¾-inch stainless steel reactor with Swagelok end caps. Vycor chips are then packed into the reactor and 5.1101 g of 16 m$^2$/g SiO$_2$ is then placed so that the Vycor chips keep the zinc from contacting the SiO$_2$. The reactor is flooded with nitrogen and the reactor is sealed. The sealed reactor is heated to 970° C. in an oven with a nitrogen atmosphere for 2 hours. The heated reactor is removed and cooled in a dessicator overnight. The supported vapor is removed from the cooled reactor in a glove bag. The supported vapor is stirred in 0.300 liters (L) of water containing 1.9368 g of silver lactate for one hour.

EXAMPLE 12

A 16-g sample of the supported catalyst of Example 1 is washed with water three times and acetone once, then is dried at 100° C. in air. This dried catalyst is placed between two glass wool plugs to create a 3- to 4-inch reaction zone in a ⅜-inch (9.5 mm) inner diameter, stainless steel reactor. The catalyst is conditioned by passing a preheated, premixed feed consisting essentially of about 68 mole percent propylene, about 29 mole percent oxygen and about 3 mole percent water through the catalyst at a temperature of about 150° C. to about 180° C. and a pressure of about 1 atmosphere and a flow rate of about 30 cc/minute until the selectivity to propylene oxide stabilizes (typically about 5 days). The dried supported catalyst converts 0.78 percent propylene at 180° C. with a selectivity of 21 volume percent to propylene oxide based on propylene. The by-products are carbon dioxide and water. The specific epoxidation rate is 4.85.

Examples 1 through 11 illustrate various embodiments of the invention. Example 12 illustrates the use of a catalyst formed by the invented process.

What is claimed is:

1. A process for forming a supported metal catalyst comprising: (a) generating metallic vapor by heating zero valent metal to a temperature sufficient to generate at least about 0.25 atmospheres of metallic vapor; (b) contacting the metallic vapor with a support under conditions sufficient to deposit the metallic vapor onto the support thereby forming a first supported metal, providing the heated zero valent metal is not in contact with the support; and (c) contacting the first supported metal with a solution containing ions of a catalytic metal which will electrodeposit on the support, thereby liberating ions of the first supported metal and forming a supported metal catalyst.

2. The process of claim 1 in which the zero valent metal produces a metallic vapor having a condensation temperature below about 2000 K., or a mixture of such metals.

3. The process of claim 2 in which only one zero valent metal is used.

4. The process of claim 3 in which the zero valent metal is selected from the group consisting of sodium, potassium, rubidium, cesium, lithium, zinc, cadmium, magnesium, calcium, strontium, and barium.

5. The process of claim 4 in which the zero valent metal is zinc.

6. The process of claim 1 in which the electro-deposited catalytic metal is a metal from the group consisting of copper, cobalt, nickel, iron, palladium, and platinum.

7. process of claim 6 in which the first supported metal is zinc and the support is silica.

8. The process of claim 1 in which the contact is with the diffusion method.

9. The process of claim 1 in which the contact is with the carrier-assisted method.

10. The process of claim 1 in which the catalyst support is $SiO_2$, SiC, $TiO_2$, $BaTiO_3$, $Al_2O_3$, MgO, carbon black or a zeolite.

11. The process of claim 10 in which the catalyst support is $SiO_2$.

12. The process of claim 1 in which the supported catalyst has a loading between about 0.05 weight percent and about 40 weight percent.

13. The process of claim 12 in which the supported catalyst has a loading between about 0.1 weight percent and about 10 weight percent.

14. The process of claim 1 in which the supported catalyst has an average particle size between about 0.15 mm and about 15 mm.

15. The process of claim 9 in which the metallic vapor comprises between a mole fraction of about 0.001 and about 1.0 of the carrier gas-metallic vapor stream.

16. The process of claim 1 in which the support has a porosity between about 0.01 cc/g and about 3.5 cc/g of a support.

17. The process of claim 9 in which the temperature is between about 373 K and about 1773 K and the space velocity of carrier gas through the support is between about 0.03 $hr^{-1}$ and about 3,000 $hr^{-1}$.

18. The process of claim 1 in which the catalyst supports have an average BET surface area between about 0.01 $m^2/g$ and about 700 $m^2/g$.

19. The catalyst formed by the process of claim 1, wherein the first supported metal is a metal with an oxidation potential of at least about 0.3 v.

20. The catalyst formed by the process of claim 7.

* * * * *